United States Patent [19]
Pippin et al.

[11] Patent Number: 5,551,822
[45] Date of Patent: Sep. 3, 1996

[54] ORDER FILLING SYSTEM WITH CARTRIDGE DISPENSER

[75] Inventors: James M. Pippin, Keller; Jerry D. Erwin, Dallas, both of Tex.

[73] Assignee: ElectroCom Automation L.P., Arlington, Tex.

[21] Appl. No.: 434,030

[22] Filed: May 3, 1995

Related U.S. Application Data

[60] Continuation of Ser. No. 177,140, Jan. 4, 1994, abandoned, which is a division of Ser. No. 115,247, Sep. 1, 1993, Pat. No. 5,322,406, which is a continuation of Ser. No. 884,863, Apr. 16, 1992, abandoned, which is a continuation of Ser. No. 566,530, Aug. 13, 1990, abandoned.

[51] Int. Cl.$^6$ .............................. G07F 11/00; B65G 1/02
[52] U.S. Cl. ........................ 414/273; 221/94; 221/129; 414/285; 198/349.6
[58] Field of Search .................... 414/266, 267, 414/268, 273, 276, 285, 403, 418, 274; 198/366, 359, 368, 349.6, 349.7; 221/93, 94, 95, 123, 129, 130, 131, 277, 2, 3

[56] References Cited

U.S. PATENT DOCUMENTS

| | | | |
|---|---|---|---|
| 25,098 | 12/1961 | Benson et al. | 198/349.7 X |
| 2,868,344 | 1/1959 | Shields | 221/277 X |
| 3,027,022 | 3/1962 | Peras | 198/349.7 X |
| 3,076,566 | 2/1963 | Dennis | 221/94 X |
| 3,186,588 | 6/1965 | Chapman | 221/3 |
| 3,224,544 | 12/1965 | Shoher et al. | 221/3 X |
| 3,313,448 | 4/1967 | Suttle et al. | 221/3 |
| 3,593,881 | 7/1971 | Paap | 221/3 |
| 3,624,792 | 11/1971 | Lipfert | 221/129 |
| 3,760,484 | 9/1973 | Kowalski | 22/129 X |
| 3,877,607 | 4/1975 | Long | 221/129 X |
| 4,017,001 | 4/1977 | Barthalon et al. | 221/129 X |
| 4,301,909 | 11/1981 | Snavely | 221/123 X |
| 4,518,302 | 5/1985 | Knapp | 198/349.7 |
| 4,573,606 | 3/1986 | Lewis et al. | 221/3 X |
| 4,872,591 | 10/1989 | Konopka | 221/3 |
| 4,961,507 | 10/1990 | Higgins | 221/129 |
| 4,980,292 | 12/1990 | Elbert et al. | 221/3 X |

*Primary Examiner*—Karen B. Merritt
*Assistant Examiner*—Stephen Gordon
*Attorney, Agent, or Firm*—Harold E. Meier

[57] ABSTRACT

An automated ordering system has a gathering conveyor belt and a plurality of product dispensers for dispensing products onto the gathering conveyor belt, the plurality of product dispensers arrayed in a matrix in rows and columns wherein each row of product dispensers and each column of product dispensers share common control elements. The product dispensers are of cartridge type utilizing gravity to eject products from a cartridge suspended above the gathering conveyor belt onto the gathering conveyor belt. A universal product dispenser platform accepts a wide range of different sizes and shapes of cartridges storing products to be dispensed. The universal product platform provides support for an actuator for singulating products mounted to the cartridge.

6 Claims, 9 Drawing Sheets

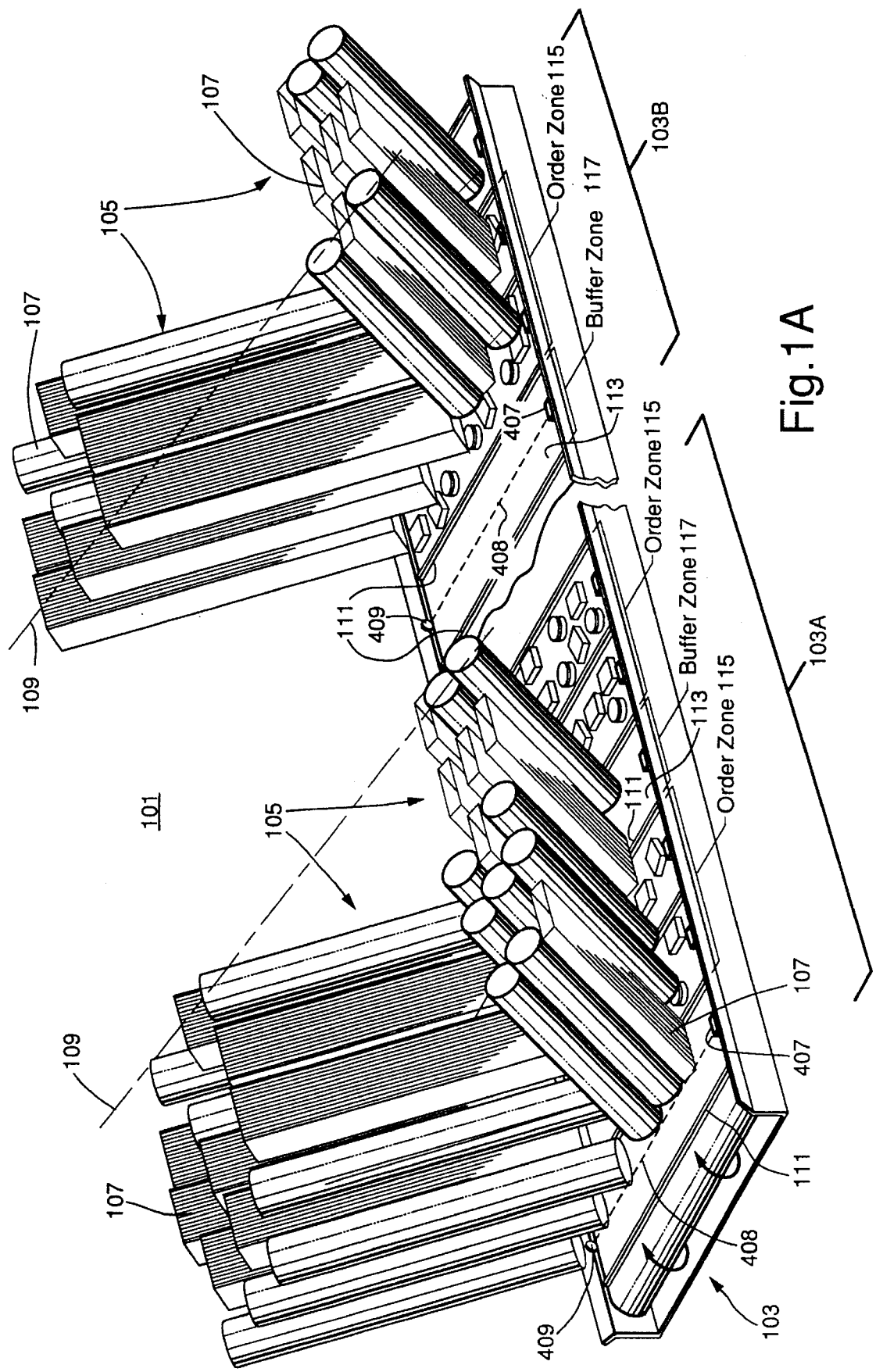

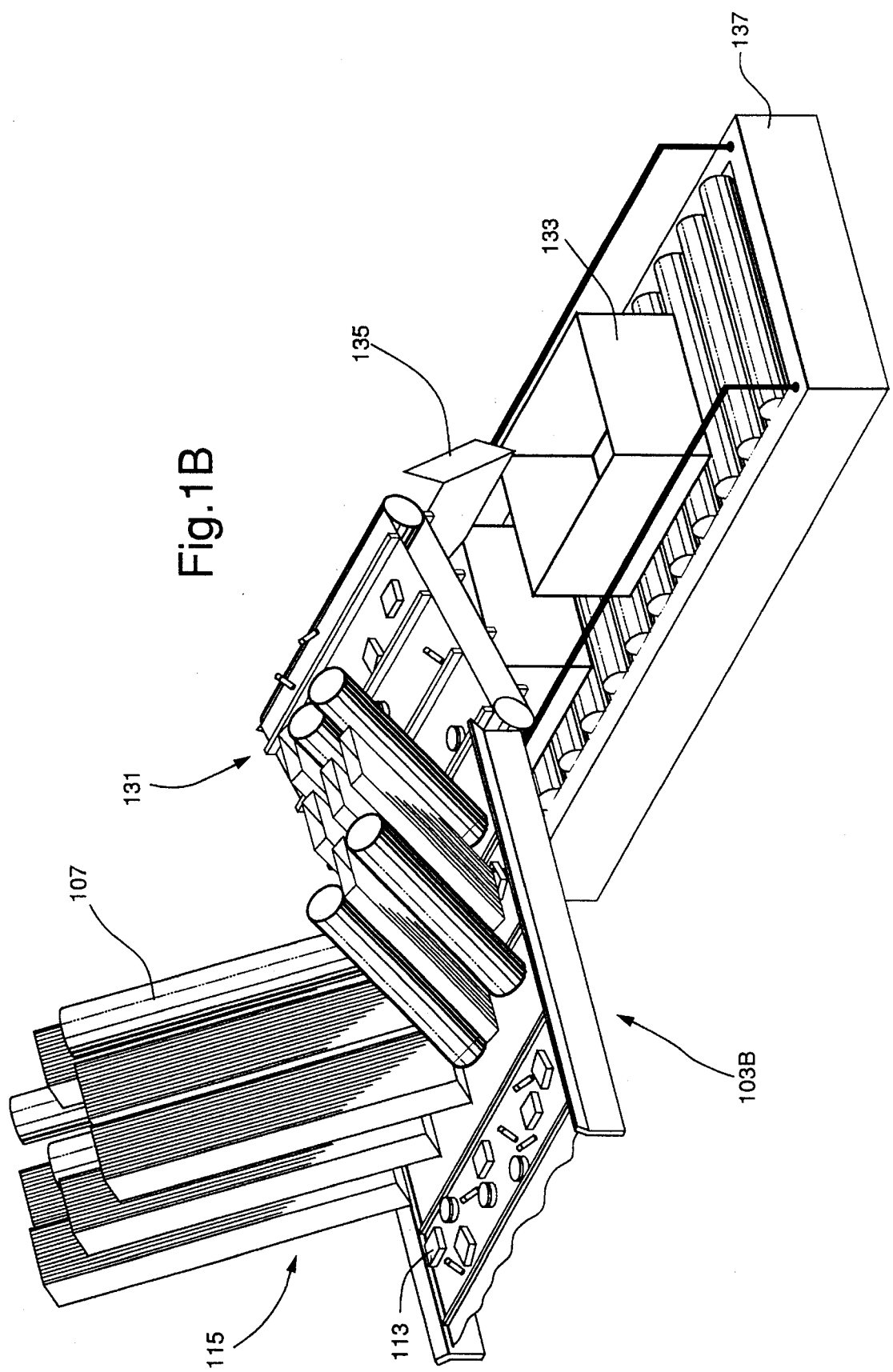

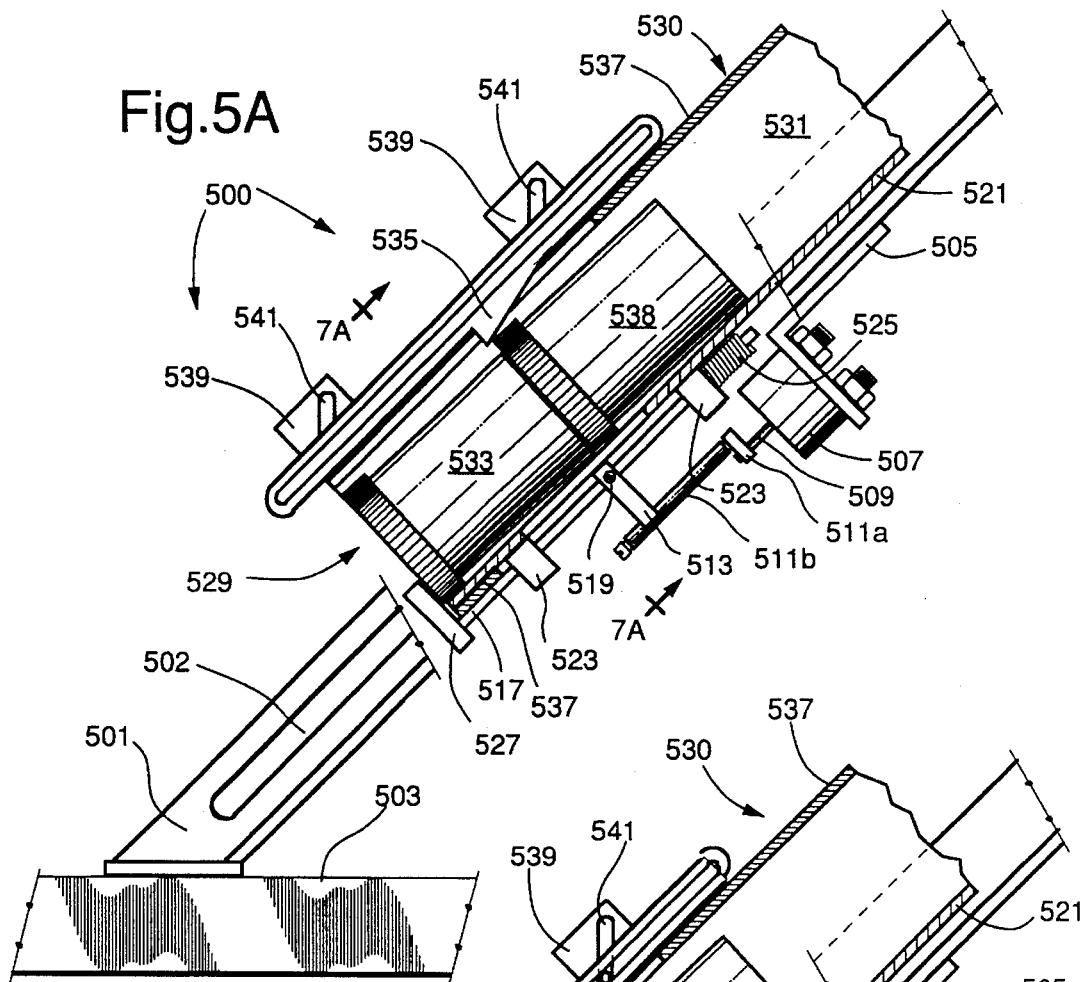
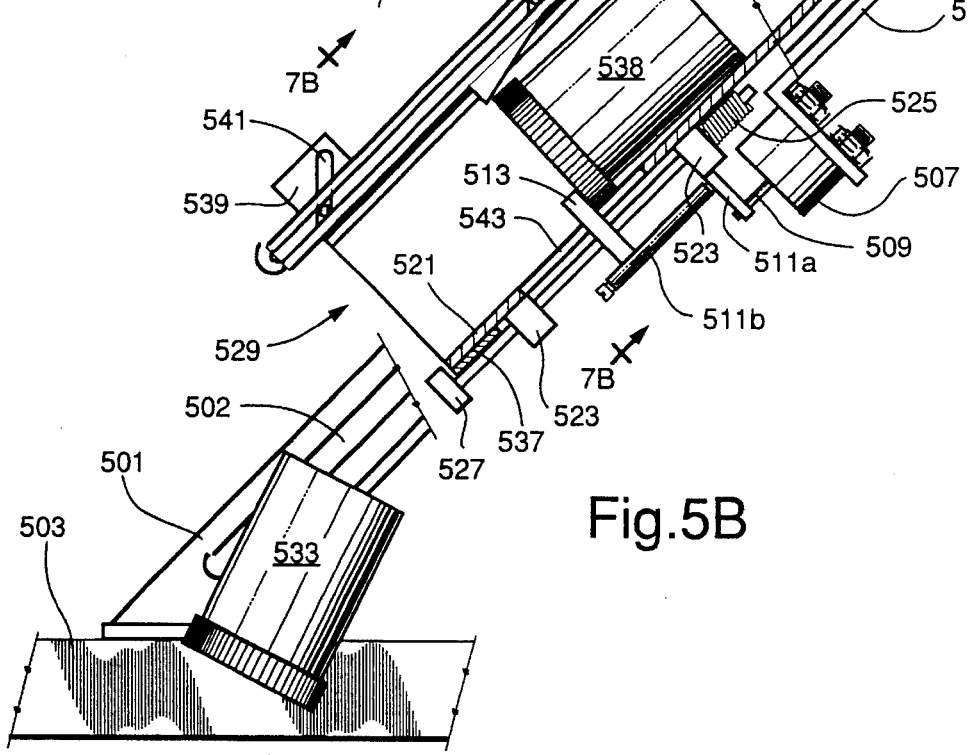

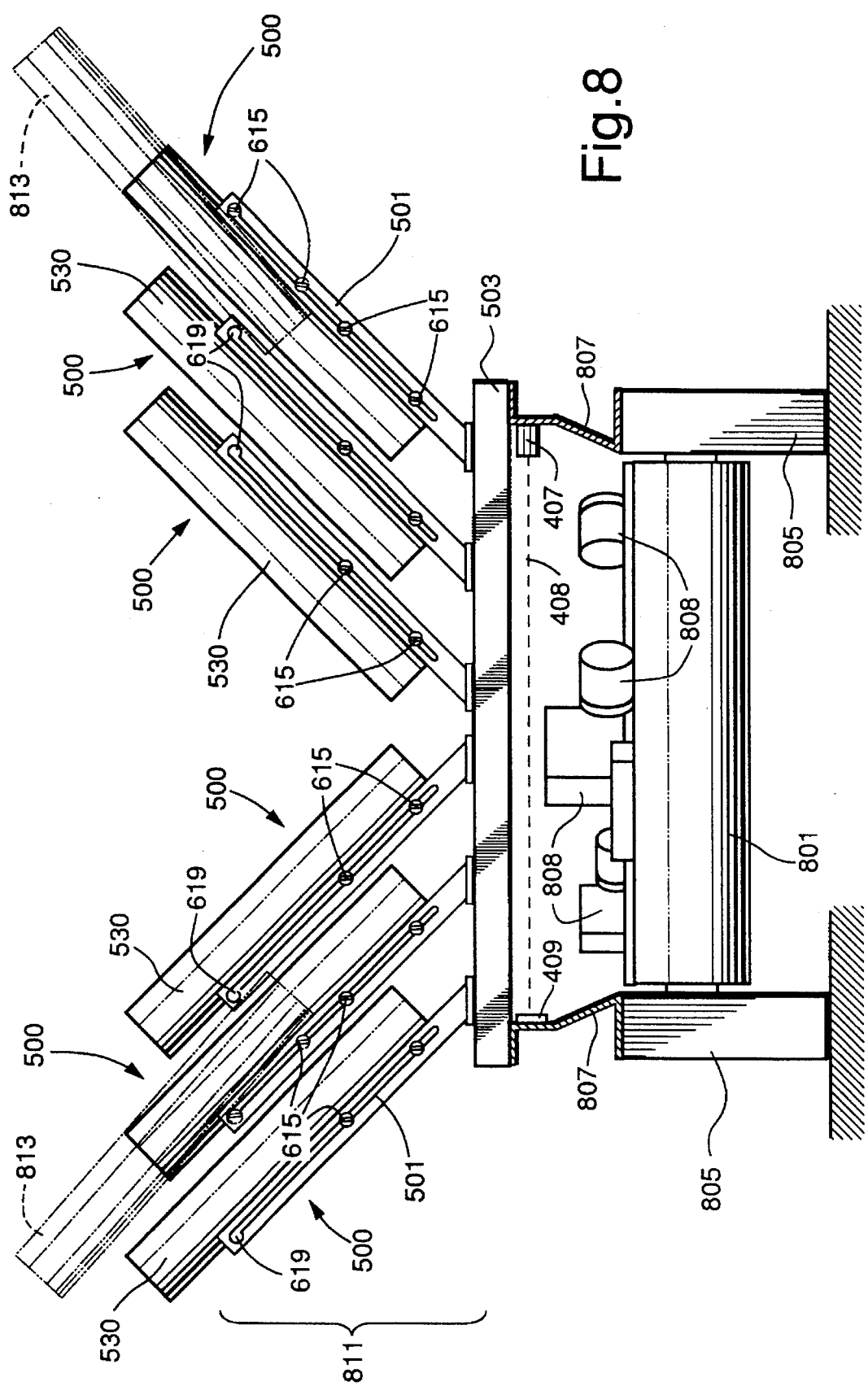

ORDER FILLING SYSTEM WITH CARTRIDGE DISPENSER

This application is a continuation application of Ser. No. 08/177,140 filed Jan. 4, 1994, now abandoned, which is a division of Ser. No. 08/115,247 filed Sep. 1, 1993, now U.S. Pat. No. 5,322,406 granted Jun. 21, 1994, which is a continuation of Ser. No. 07/884,863 filed Apr. 16, 1992, now abandoned, which is a continuation of Ser. No. 07/566,530 filed Aug. 13, 1990 now abandoned.

TECHNICAL FIELD

The present invention relates to order filling systems and product dispensers for filling orders for products in less than case lot quantities, and in particular to automated systems and product dispensers for picking products at medium volume rates.

BACKGROUND OF THE INVENTION

Most often, a manufacturer of products packages a plurality of products, sometimes called a lot, into cases for storage and subsequent shipping to distributors. The quantity of products in the case is referred to as a case lot quantity. At some point during the distribution of the product, a manufacturer or a distributor may be required to break open a case for further distribution of the products in less than case lot quantities. Frequently, products in less than case lot quantities are assembled with other products pursuant to an order that includes more than one product.

A distributor or manufacturer who supplies less than case lot quantities must pick products from the cases, referred to as broken case order picking, before shipping an order that includes a selection of products. Filling an order for multiple products in less than case lot quantities requires going to a case for each product, picking and counting the number of units of the product from the case, and assembling the picked products to be shipped into a single container. These tasks have, in the past been performed manually. People, though, are relatively slow and prone to pick or pull wrong products and incorrect quantities from the cases and may even forget to pull a particular product. Automation of broken case picking is, consequently, preferred in order to minimize the number of incorrectly filled orders and the costs resulting from picking errors.

Automated ordering systems (AOS) are available to automate the picking process. In a typical AOS, a terminal operator receives an order and types it into the system on a keyboard as a part of a terminal coupled to a host computer. The host computer handles accounting and inventory control functions for the distribution operation. The host computer provides the order to a workstation for handling or editing. When the order is ready to be executed, a central control computer as a part of the work station directs in real time the filling of the order.

An AOS is comprised, in essence, of a plurality of individual product dispensers stocked with different types products that are arrayed along the length of a gathering conveyor belt. In some systems there are literally hundreds or thousands of different products and product dispensers. The gathering conveyor belt is constantly moving. The central control computer segments or defines virtually, in memory, one or more gathering conveyor belts into order zones, separated by buffer zones, in which are collected products for filling an order. As a virtual order zone for a particular order moves past a product dispenser stocking a selected product, the central control computer directs a programmable logic controller associated with that product dispenser to cause the product dispenser to dispense the ordered quantity of the product.

Product dispensers in an AOS singulate the products for counting—a product dispenser dispenses only one product at a time—and verifies that the products have been dispensed. Typically, associated with each product dispenser is a photoelectric cell or some other means for detecting a product to verify that a product is actually dispensed. In order to ensure that a product dispenser actually dispenses an ordered quantity of product into an order zone as it passes the dispenser, the product dispenser must be capable of rapidly ejecting products onto the gathering belt. To achieve rapid rates of dispensing, a force must generally be applied to the product. Given that product dispensers must singulate and rapidly eject products, elaborate means for dispensing and means for controlling the dispenser are required, especially as throughput of an AOS is increased.

Product dispensers must also address the problem of replenishing the stock of products in each dispenser. The stock in some product dispensers is replenished manually; others have elaborate automated means for replenishing. Whatever method is chosen, a replenishing system must be provided, usually complicating the effort to achieve an optimum design of the product dispenser and sometimes demanding compromise.

Finally, the cost of automation limits the use of an AOS such has been described to high volume products. In most broken case distribution operations, about twenty percent of the different types of products account for eighty percent of the total volume of products picked and shipped. There may be, for example, products handled by the distribution operation that are picked only once a month. The return on investment for incorporating products picked only once a day, much less once a month, rarely justifies automation. The high cost of an AOS, therefore, deters automation for most of the broken case operations.

Prior art product dispensers for an AOS are directed to high volume picking, high volume being required to achieve a sufficiently high return on investment to justify automation. The prior art tends, therefore, to teach against automating lower volume products. Consequently, approaches to low volume picking do not utilize AOS that have been described. Instead, the low volume approaches analogize to manual picking. One such approach, called a "flying dutchman", utilizes a sled mounted on a track beneath magazines holding products. The sled speeds back and forth along the track picking with a mechanism on the sled products from the magazines and placing them on the sled, much like a person manually picking products. It has the advantage of requiring a minimal number of dispensing mechanisms, but at the expense of, among other disadvantages, requiring a very sophisticated and expensive control mechanism for moving the sled and picking mechanism. Another approach is the use of robotic carts roaming the warehouse. It too suffers from complicated controls.

SUMMARY OF THE INVENTION

Addressing primarily the problem of automating picking products on a cost-effective basis, the invention is a medium volume automated ordering system (AOS-MV) and product dispenser for picking types of products where the lower volume does not make it viable for automation utilizing prior art high volume AOS (AOS-HV). Contrary to the teachings of prior art AOS-HV and other proposed approaches to the problem of automating medium volume picking, the present invention utilizes a gathering conveyor belt for lower volume products and the same or similar central control computer and programmable logic controllers used in AOS-HV. Indeed, an AOS-MV in accordance with the teachings of the present invention may be integrated into an AOS-NV system having the same order management system, central control computer and product dispenser controllers. High volume gathering conveyor belts pick the high volume products required to fill an order and medium volume gathering conveyor belts, operating in parallel more or less synchronously with the higher volume belts, pick the medium volume products identified in the order at approximately the same time. An index conveyor belt then collects all products for the order from all gathering conveyor belts as the orders appear (order zones on the belts being delayed with respect to each of these to permit collecting in a common tote) for transporting the order either to a manual picking area for completing the order with very infrequently picked products, or to a shipping area if complete.

Unlike prior art AOS-HV, the present invention utilizes a matrix arrangement of product dispensers with means for controlling the "firing" of the product dispensers that minimize the number of components necessary for dispensing a product and verifying that the product has been dispensed, resulting in reduced system costs. Product dispensers for a gathering conveyor belt are formed into a "matrix" of dispensers mounted in a row across a gathering conveyor belt at a height above the belt to permit dispensed products to pass freely. Multiple rows of product dispensers are mounted along the length of the gathering belt. This matrix arrangement has the advantage of permitting rows and columns of product dispensers to share common control elements, such as programmable logic controllers, relays and photoelectric cells for verification. Though sharing of control elements usually permits only one dispenser in a given row and column to be fired at a time, the present invention recognizes that, given the low quantities of products to be dispensed, there is a low probability more than one product dispenser in any given row or column will be fired simultaneously. Consequently, the total number of components needed for the control system is reduced.

The product dispenser for the present AOS-MV is also designed, unlike most prior art product dispensers, to take special advantage of lower volumes of products dispensed to reduce cost, as well as address concerns special to lower volume product dispensing. First, the means for singulating and dispensing a product is able to utilize gravity instead of a powered delivery since quantities of a product dispensed into any one order zone are small. Second, the product dispenser is small and compact, permitting a closely packed configuration along a gathering conveyor belt. Third, since these low volume products are not frequently dispensed, a cartridge for holding the products also acts as a suitable storage container. These cartridges are adaptable to various sized and shaped products. Fourth, a universal product dispenser platform that is capable of holding a range of cartridges of different sizes and shapes is mounted to a gathering conveyor belt.

Each cartridge has a mechanism for singulating the product stored therein. Mounted to each platform is a universal actuating mechanism for actuating the mechanism for singulating. Fifth, replenishment is a simple manual operation. To further improve the replenishment process, and reduce the amount of time required for it, the cartridge is canted to the nearest side of the gathering conveyor belt-for easy access. The gathering conveyor belt is also mounted low to the ground to facilitate access. The cartridge has an opening along its length so that a stack of products is set in instead of being placed through an end one at a time. The cartridge is mounted to slide off the platform and be replaced with a previously filled cartridge. It may also be tilted back to permit access to the opening in the cartridge for refilling.

BRIEF DESCRIPTION OF THE DRAWINGS

FIGS. 1A and 1B are perspective views of an automated ordering system (AOS) having a plurality of product dispensing arranged in a matrix fashion.

FIGS. 5A and 5B are cross-sectional side views of a cartridge type of product dispenser illustrating the process of dispensing a product.

FIG. 8 is a cross-sectional elevational view of a medium volume AOS (AOS-MV) with a plurality of cartridge type product dispensers (without means for actuating shown) mounted in a row across a gathering conveyor belt.

DETAILED DESCRIPTION OF THE DRAWINGS

Figure 2:
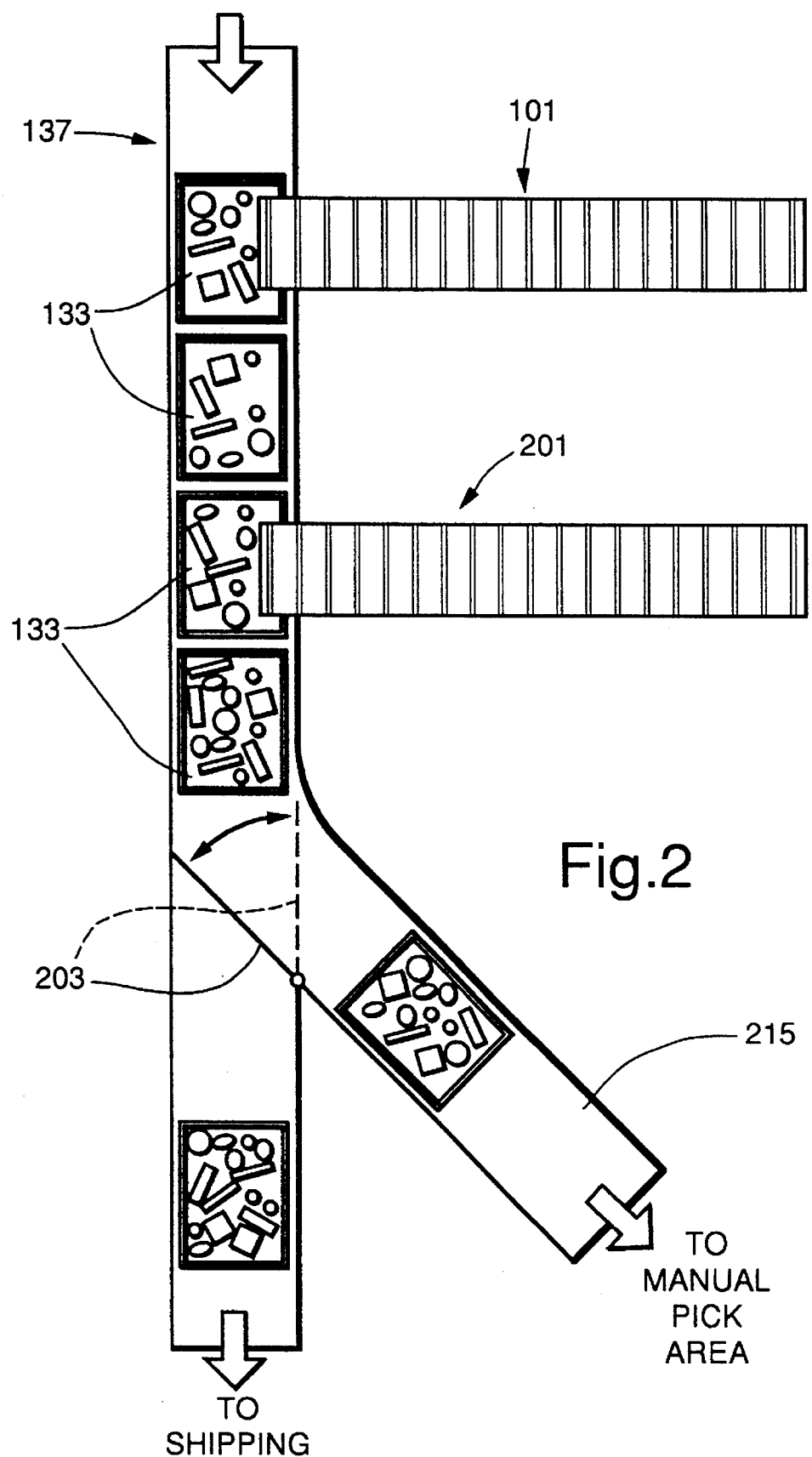
FIG. 2 is schematized plan view of a warehouse having two AOS and an index conveyor for collecting products from each AOS to complete an order.

Referring now to FIG. 1A, there shown a perspective view of an automated ordering system for medium volume products (AOS-MV) 101. Suspended above a gathering conveyor belt 103 are a plurality of product dispensers 105. Only a cartridge 107 for storing a product to be dispensed onto gathering conveyor belt 103 for a cartridge type product dispenser for medium volume products is illustrated. Each cartridge 107 indicates the position of a product dispenser. Product dispenser cartridges 107 may be of different shapes and sizes, as shown, with only limited restriction on the placement of the cartridge with respect to the conveyor belt or gathering conveyor belt 103 due to the cartridges size or shape. Product dispenser cartridges 107 store a plurality of different products (not shown) for dispensing.

The plurality of product dispensers 105 are arranged in a "matrix" fashion in rows and columns such that a particular product dispenser, or more particularly its location, may be identified by an "x" and "y" coordinate system. Other means for dispensing may also be used, including high volume product dispensers, also arranged in a matrix fashion. Dashed line 109 indicates a row ("row" is chosen for notation purposes only, as it may also be labeled a "column" if desired) of product dispensers having a known location with respect to the direction of travel of gathering conveyor belt 103. In FIG. 1A, six product dispensers per row are shown. However there is no inherent limitation on the number of product dispensers per row except by the space requirements imposed by the product dispensers. Further, there is no specific requirement that each position on the row be occupied by a product dispenser. The plurality of product dispensers in the matrix also forms columns along the length of the gathering conveyor belt 103, the number of columns equaling the number of product dispenser positions in a row. Precise physical alignment of product dispensers in the columns is not required.

The matrix arrangement may also be utilized with high volume AOS (AOS-HV).

Gathering conveyor belt 103 is shown to have ribs 111 to prevent products dispensed onto the conveyor 113 from rolling. Other methods of clearing the conveyor belt well known in the art may also be employed. The gathering conveyor belt 103 is separated into defined order zones 115 and buffer zones 117. An order zone 115 represents one order or a part of one order. Order zones need not be spaced apart at equal distances. The order zones and buffer zones are not physically defined on the gathering belt 103 (an order zone is not defined by position of the ribs 111). The position and size of the order zones are defined virtually in a central computer controller (not shown). The central computer controller tracks the positions of the order zones 115 in real time as each zone moves with the gathering conveyor belt 103. As an order zone moves beneath a product dispenser 105 storing a product on an order, the product dispenser dispenses the product into the order zone.. Buffer zones 117 minimize the possibility of products from adjacent order zones accidentally mixing.

Extending beneath each row of product dispensers, but above products on conveyor 113, is a beam of light 408 emitted from photo electric switch 407 and reflected by reflector 409 back to a photo electric switch 407.

The gathering conveyor belt 103 is shown divided into front end 103A and a terminating end 103B.

Referring now to FIG. 1B, the terminating end 103B of gathering conveyor belt 103 transfers products in an order zone onto a conveyor belt 131 which acts as a transition between gathering conveyor belt 103 and index conveyor 137. Transition conveyor belt 131 transports the products from the gathering conveyor belt 103 to slide 135. Slide 135 directs products into a tote 133 that is positioned beneath slide 135 by index conveyor 137.

Referring now to FIG. 2, there is shown a plan view schematic representation of the integration of AOS-MV 101 into an automated picking operation with an AOS 201, which is either an AOS-MV or high volume AOS (AOS-HV). AOS-MV 101 and AOS 201 are shown in representational format. In a warehouse operation, there will likely be multiple AOS-MV lines and multiple AOS-HV lines terminating in one or more index Conveyors 137. To fill an order, products may be dispensed from more than one AOS line. Totes 133 and index conveyor 137 act as a means to gather or to collect portions of the order from each of the AOS dispensing products to fill the order. The AOS-MV 101 may be operated in synchronization with other AOS-MV as well as AOS-HV so that all portions of an order filled by an AOS can be collected in one tote 133 on index conveyor 137. Tote 133 on index conveyor 137 collects, in the manner described in connection with FIG. 1B, an order from the AOS-MV 101. Tote 133 is moved along conveyor 137 to the second AOS 201 which is either a high volume or a medium volume AOS that fills another portion of the order. In operation, tote 135 appears at the end of a AOS just in time to collect from the products deposited onto buffer conveyor belt 131 (FIG. 1B) before the next order zone is deposited.

After one or more totes 133 collects all the portions of an order from all the AOS in the warehouse, tote 133 proceeds to gate 203 on index conveyor 137. If some of the ordered products must be picked manually, tote 133 is diverted to conveyor 215 which takes the tote 133 to a manual pick area. If the order is filled, gate 203 permits tote to continue on index conveyor 137 to a shipping area.

Other means of collecting portions of the order from each AOS may be used instead of totes, such as compartmentalized conveyor belts and robotic carts.

Figure 3:
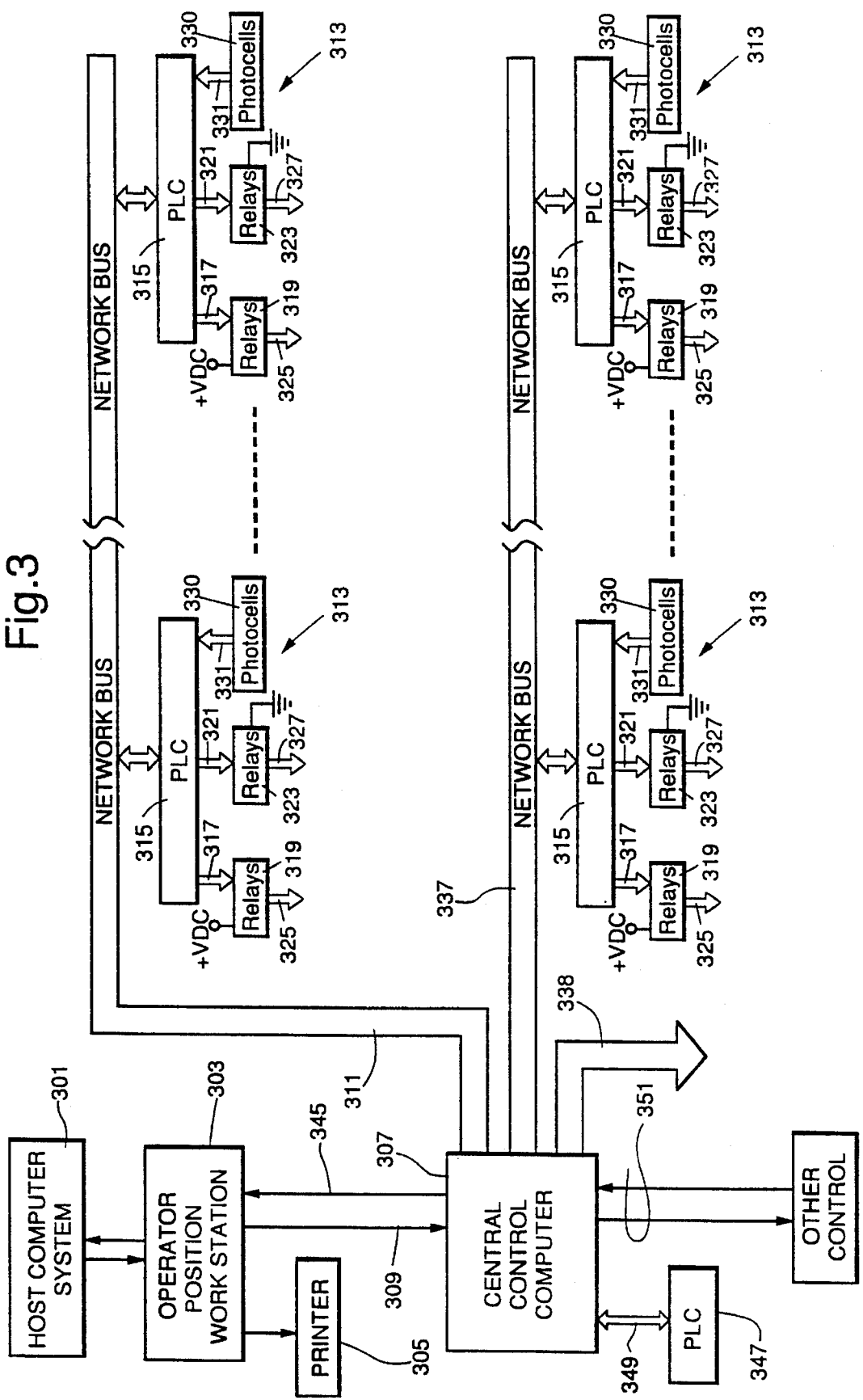
FIG. 3 is a block drawing and data path of a integrated automated control system for multiple AOS in a warehouse.

Referring now to FIG. 3, there is shown a schematic diagram of the control system for a multiple-AOS system. Orders received by the distributor are entered into and stored in host computer 301. Accounting and inventory control functions reside in the host computer 301. The host computer provides the order to an-operator position work station 303 for editing if desired. The operator position work station determines when the order is to be released to the AOS for picking. Connected to the operator position work station 303 is an order printer 305 on which a hard copy of the order may be printed.

A released order is received from the operator position work station 303 by a central control computer 307 on bus 309. Central control computer 307 controls the real-time operation of all the AOS-MV, AOS-HV and index conveyors as well as other automated functions in the warehouse. Central control computer 307 creates or defines on the appropriate AOS the necessary order zones to fill the order and keeps track in real-time of the position of each order zone 115 on each gathering conveyor belt 103 (FIG. 1) of each AOS. This computer also issues the address of a product dispenser to trigger a firing signal at such time as to cause a product dispenser stocking an ordered product to fire and to dispense or release the product onto the gathering conveyor belt as an order zone passes beneath the row in which the product dispenser is located.

Network buses 311, 337 and 338 links the central control computer 307 to each of the AOS in a warehouse. Coupled to each network bus are a plurality of product dispenser controllers 313 to which are coupled product dispensers 105.

A programmable logic controller 315 as a part of a product dispenser controller 313, after receipt of a firing or dispense signal from central control computer 307 on network bus 311, issues a first actuating signal on a line bus 317 to a relay bank 319, and a second actuating signal on a line bus 321 to a relay bank 323. Relay bank 319 has "M" relays and bus 317 has "M" relay control lines, one for each relay. Relays in relay bank 319 couple to +VDC solenoids or other actuating means, such as a servo-motor, of product dispensers (105 of FIG. 1A) intercoupled in columns, each column of product dispensers being coupled to a common relay in relay bank 319, through lines 325. Relay bank 323 has "N" number of relays, and bus 321 has "N" number of relay control lines. Relays in relay bank 323 couple to ground solenoids or other actuating means of product dispensers (105 in FIG. 1A) intercoupled in rows, each row of product dispenser being coupled to a common relay in relay bank 323, by lines 327. In effect, when a relay in relay bank 323 and a relay in relay bank 319 are simultaneously energized, a power circuit is completed for energizing a solenoid or other means for actuating of a product dispenser common to both a column of product dispensers coupled to the relay in relay bank 319 and a row of product dispensers coupled to the relay in bank 323. A detailed schematic of a product dispenser controller is described in FIG. 4.

The programmable logic controller 315 also receives input signals on bus 331 from photoelectric cells that verify that a product has been dropped onto gathering conveyor belt 103 (FIG. 1).

The product dispenser controller 313 has a limited number of outputs and inputs available. As one AOS-MV AOS-HV may have many product dispensers associated with it, more than one product dispenser controller 313 may be required to control an AOS.

Central control computer 307 also controls an AOS-MV lines by means of a network bus 337. Network bus 338 provides control signals from central control computer 307 to additional AOS-MV. The operation of each of the product dispenser controllers 313 is identical to that described above in connection with data highway 311. As indicated, more than one product dispenser controller 313 may be required to control all the product dispensers on a single AOS-MV.

Central control computer 307 also receives signals indicating verification for dispensed products on network buses 311, 337 and 338 from all the product dispenser controllers 313. If the central control computer 307 fails to receive the verification that the product has been dispensed as directed, the computer 307 advises operator position work station 303 on line 345 that a product has failed to be dispensed. Operator position work station 30a then issues-appropriate instructions to personel on hand in the warehouse for completing the order and directing actions necessary to correct the problem, such as replenishing the product dispenser with the products. Central control computer 307 also controls index conveyor 137 (FIGS. 1B and 2) through a programmable logic controller (PLC) 347 via bus 349. Other automated functions in the warehouse may also be controlled by central control computer 307 through lines 351, such as operating gate 203 (FIG. 2).

Figure 4:
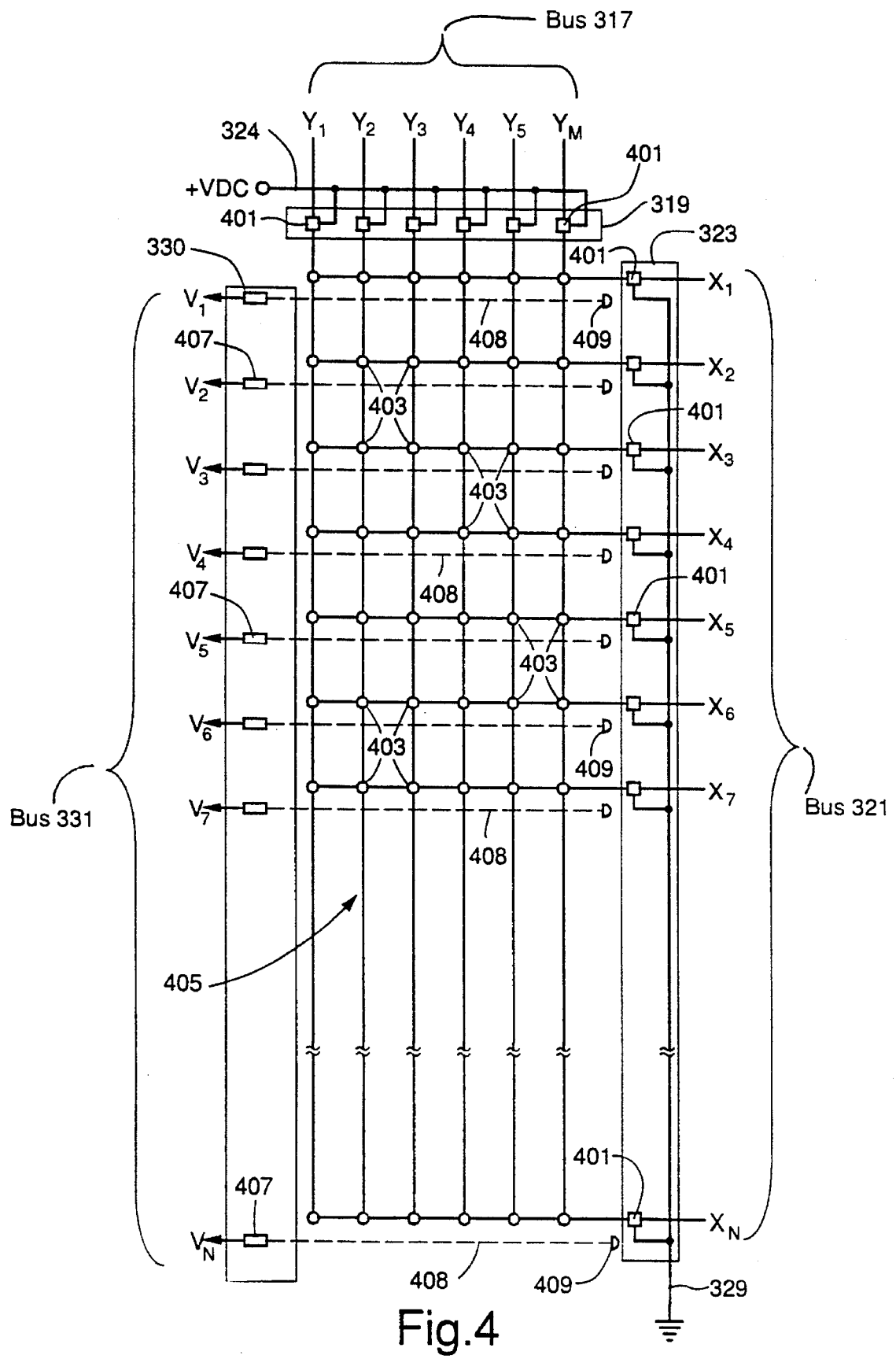
FIG. 4 is a matrix schematic of a controller for a plurality of product dispensers wherein a row of product dispensers are coupled to a common control element and share a common means for verifying dispensing of a product, and columns of product dispensers sharing a common control element.

Referring now to FIG. 4, there is shown a schematic representation of a matrix 405 of product dispensers 403 (product dispenser 105 in FIG. 1A). Bus 317 (FIG. 3) is comprised of relay control lines labeled $Y_1$ to $Y_M$ where M is the number of product dispensers in a column. Each relay control line Y is connected to a relay 401 in the relay bank 319. Bus 321 (FIG. 3) is also comprised of relay control lines labeled $X_1$ to $X_N$, where N is the number of rows of product dispensers controlled by a product dispenser controller 313 (FIG. 3). Each relay control line is connected to a relay 401 in relay bank 323.

Product dispensers 403 are arrayed in a matrix 405. The lines extending from relays 401 in relay bank 319 interconnect columns of product dispensers 403 in the matrix 405, and represent coupling of each product dispenses 403 in a column (a column of intercoupled means for dispensing) to a common control element, namely a relay 401 in relay bank 319. Similarly, the lines from relays 401 in the relay bank 323 interconnect rows of each product dispensers 403 in the matrix 405, and represent the coupling of each product dispenser 403 in a row (a row of intercoupled means for dispensing) to a common control element, namely a relay 401 in relay bank 323.

To activate or cause to dispense a product dispenser coupled to the $m^{th}$ and $n^{th}$ relays 401, a control or actuating signal, on relay control line $Y_m$ energizes the $m^{th}$ relay in the bank of relays 319 thereby enabling each product dispenser 403 in the column coupled to the $m^{th}$ relay 401 in relay bank 319 to dispense by connecting each to a positive voltage +VDC. A second control or actuating signal from programmable logic controller 315 recieved on a relay control line $X_n$ on bus 321 energizes the $n^{th}$ relay 401 in relay bank 323 thereby enabling each product dispenser 403 in a row coupled to the $n^{th}$ relay in relay bank 323 to dispense by coupling each to ground. Typically the, programmable logic controller 315 (FIG. 3) rapidly sweeps—"turns on"—each relay 401 in relay bank 319 to insure that only one product dispenser 403 in a row of intercoupled product dispensers is enabled to dispense a product. During a sweep, one or more rows of intercoupled product dispensers are turned on by actuating one or more relays in relay bank 323 thereby completing one or more control circuits for actuating the dispensing of products.

Each row of product dispenser 403 share a means for verifying. A photoelectric switch 407 emits a beam of light 408 toward reflector 409 and detects the reflected light. The beam of light 408 is positioned so that a product dispensed from any of the product dispensers 403 in a row breaks the beam of light, and thereby verifies that a product from the row has been dispensed. Only one photoelectric cell 407 or other means for verifying is required per row of product dispensers, as only one product dispenser per row is permitted to be actuated at one time. Each photoelectric cell 407 has an output line as a part of $V_1$-$V_n$ on bus 331 that provides a verification signal to programmable logic controller 315 (FIG. 3).

Referring now to FIGS. 5A and 5B, there is shown a side view of a cartridge type product dispenser 500. A cartridge slide rail 501 having a slot 502, is mounted to cross rail 503. Attached to the cartridge slide rail 501 through a support bracket 505 is a rotary solenoid 507. Rotary solenoid 507 is a reciprocating rotary solenoid and is a type of electromechanical means for actuating product dispensers. Coupled to an output shaft 509 of rotary solenoid 507 is an actuating arm having a first member 511A extending perpendicularly from and connected to shaft 509, and a roller member 511B that extends perpendicularly from the end of first member 511A and engages stop gate 513.

Stop gate 513 is axially mounted on a shaft 517 and secured to the shaft 517 by a set screw 519. Shaft 517 is mounted to interior cartridge shell 521 with axial mounts 523 that permit shaft 517 to rotate. Located at one end of shaft 517 a spring 525 biases the position of the shaft in a first, unactuated position. Attached to the other end of shaft 517 is dispense gate 527. When the shaft 517 is in the first position, the gate 527 extends in a "closed" position across opening 529 in cartridge 530. Gate holds a product 533 in the position indicated.

Opposite from the solenoid 507 a stripper 535 extends through outer cartridge shell 537 into cavity 531. The stripper 535 functions to place a restriction in the Cavity 531 to provide just enough space to permit product 538 to pass. Stripper 535 is slidably mounted to adjustable brackets 539 that are mounted to outer Cartridge shell 537. Rotating arms 541 coupled to adjustable brackets 539 and a slot 542 in the stripper 535 permit adjusting the position of stripper 535 in order to accommodate products of different shapes (circular, square and rectangular) widths and lengths. The position of stop gate 513 must also be adjusted when the position of stripper 535 is adjusted for different length products by releasing set screw 519 and a sliding stop gate 513 along shaft 517 to a position opposite of the stripper 535.

Now referring specifically to FIG. 5B, product 533 is dispensed from cartridge cavity 531 upon actuation of rotating solenoid 507 by application of power to the solenoid. Upon actuation, rotating solenoid 507 engages stop gate 513 and causes it to rotate with the shaft 517 and extend through opening 543 into inner cartridge shell 521 (see FIG. 6 for details of the inner cartridge shell 521 and the outer cartridge shell 537). Rotation of stop gate 513 rotate the shaft 517 to a second, actuated position, thereby causing dispense gate 527 to swing open to permit product 533 to fall through opening 529 under the influence of gravity. When rotated into the second position, stop gate 513 contacts product 533 to ensure that it falls through opening 529. In the second position, stop gate 513 acts in combination with stripper 535 to prevent product 538 from falling into the space in cartridge cavity 531 previously occupied by product 533. In this manner, cartridge product dispenser 500 singulates products.

When the power that actuated the solenoid 507 is disconnected, spring 525 rotates shaft 517 and returns it to the first, unactuated position. Stop gate 513 is retracted and the cavity 531 is closed by extending dispense gate 527 over opening 529, as illustrated in FIG. 5A. At this point, product 538 falls into the position previously occupied by product 533 and is ready for dispensing, and a product (not shown) behind product 538 in a stack of products (not shown) stored within cartridge 530 falls into the position occupied by product 538.

Figure 6:
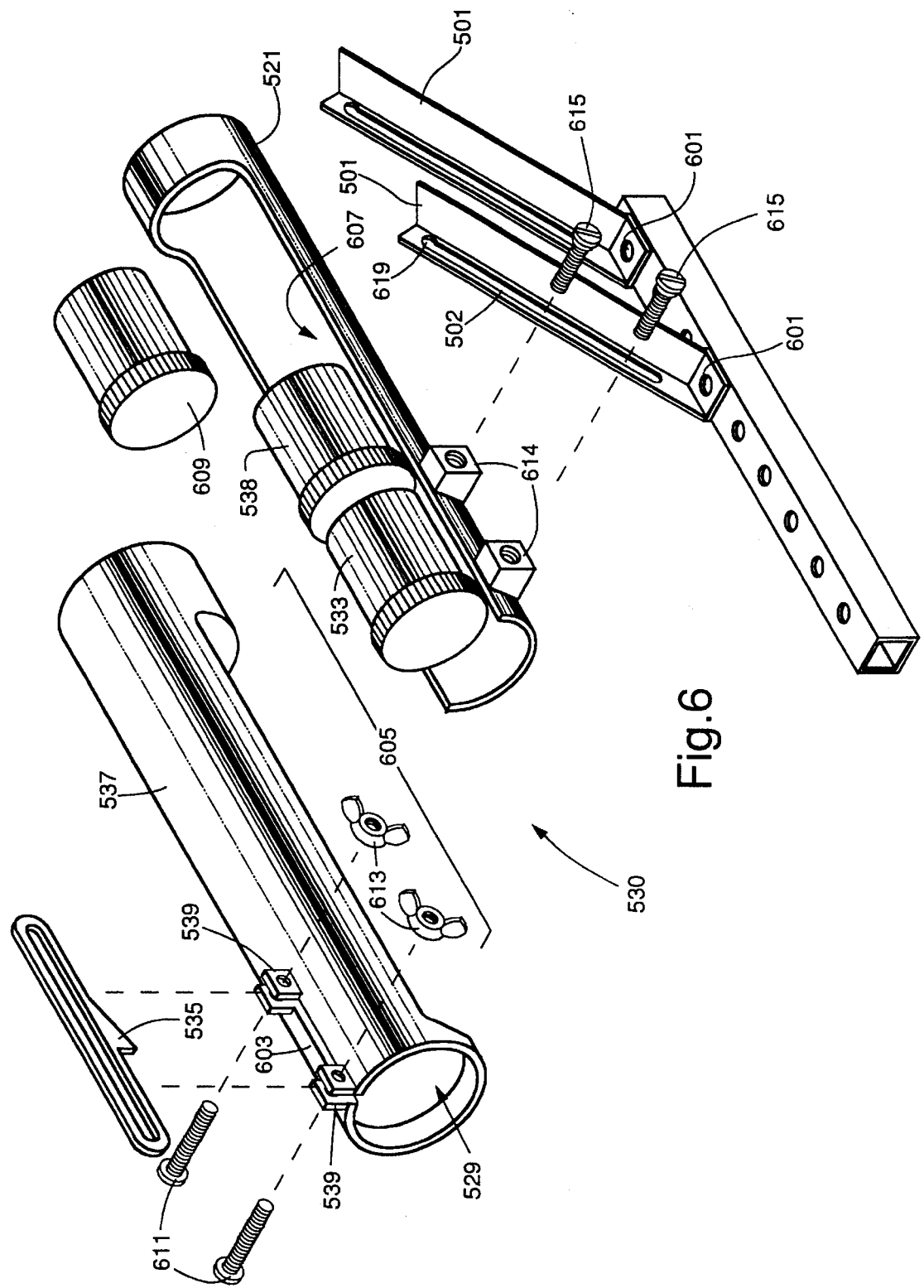
FIG. 6 is an exploded perspective view of a cartridge and mounting for a cartridge type of product dispenser.

Turning now to FIG. 6, a plurality of cartridge support rails 501 may be secured to cross rail 503 by use of bolts (not shown) inserted through holes 601.

Cartridge 530 is shown in an exploded view as including the interior shell 521, having an inner surface 607 on which a stack of products 533, 538 and 609 rest, and the outer shell 537. Interior shell 521 and outer shell 537 are assembled into cartridge 530 by inserting interior shell 521 through opening 529 defined in the end of outer shell 537. A slot 603 in the outer shell 537 permits opening 529 to be enlarged sufficiently to permit cartridge mounts 614 to be inserted through opening 529. The interior and outer shells 521 and 537 are formed of molded plastic.

The cartridge 530 as assembled (shown in FIG. 5) is opened to receive products by rotating outer shell 537 relative to interior shell 521 such that opening 605 is aligned with the inner surface 607. Exposing inner surface 607 permits products 533, 538 and 609 to be inserted into cartridge 530. To close the cartridge, the outer shell 537 is rotated in the opposite direction, thus providing a suitable storage means for products 533, 538 and 609.

As shown in FIG. 6, the stripper 535 is inserted through slot 603 and secured to mounts 539 with bolts 611 and wing nuts 613.

The assembled cartridge 530 is slidably mounted to cartridge support rail 501 with bolts 615 threaded into mounts 614 through slot 502 defined in cartridge slide rail 501. A key hole 619 is provided large enough to permit passage of the head of bolt 615 for assembly and removal of the cartridge 530.

Figure 7A:
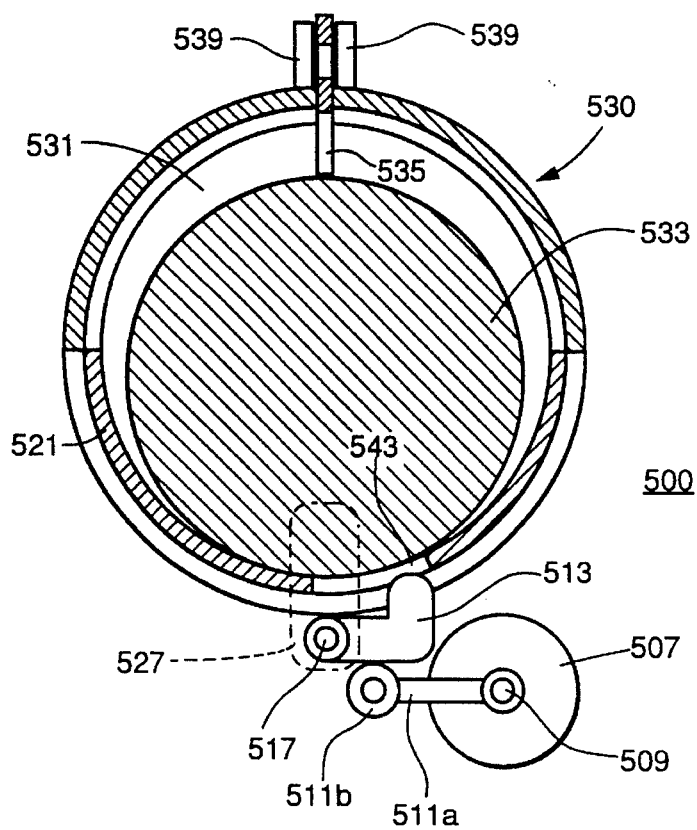
FIGS. 7A and 7B are cross-sections taken along section lines 7A—7A and 7B—7B, respectively, in FIGS. 5A and 5B, respectively.

Referring now to FIG. 7A, there is shown a cross-section taken along section 7A—7A of FIG. 5 illustrating the method of singulation employed by cartridge type dispenser 500. In a first, unactuated position the dispense gate 527, shown in phantom, extends across the open end 529 (FIG. 5A) of cavity 531 for holding product 533 (shown in cross section). Stop cam 513 is in a retracted position and does not extend through opening 543 into cartridge cavity 531. Rotary solenoid 507 is not actuated, actuating arm 511A is in a retracted position.

Figure 7B:
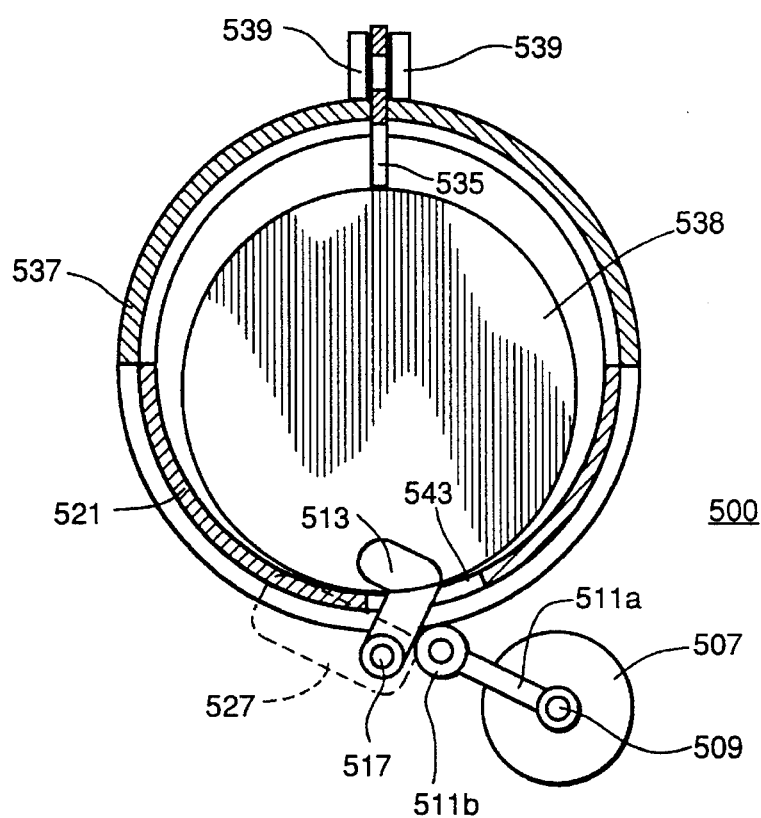

Referring now to FIG. 7B, there is shown a cross-section taken along section line 7B—7B of FIG. 5B, when power is applied to rotary solenoid 507 it causes actuating arm 511A to move into an actuated position. Roller arm 511B applies a force generated by actuation of rotary solenoid 507 to stop gate 513 thereby causing the stop gate to rotate and extend through opening 543 into cartridge cavity 531. Application of a force by rotary solenoid 507 to stop cam 513 also causes shaft 517 to rotate into a second, actuated position. Rotation of the shaft 517 into a second position rotates the dispense gate 527 into an open position and it now does not extend across opening 529 (FIG. 5) of cartridge cavity 531. This permits product 533 (not shown) to fall out of opening 529. The stop gate 513 now holds product 538, the product stacked on top of product 533 (see FIG. 5) and prevents it from falling through opening 529 (FIG. 5) while the dispense gate 527 is open. The described operation singulates the products stored in cartridge 530 for dispensing.

Referring now to FIG. 8, there is a cross-sectional elevational view of an AOS-MV utilizing cartridge type product dispensers 500 (FIG. 5) arrayed in a row across a gathering conveyor belt 801. Conveyor side fences 807, one deployed on each side of gathering conveyor belt 801, mounted to supports 805 prevent products from falling off the side of the conveyor belt. Conveyor side fences 807 also provides supports for mounting cross rails 503 across the gathering conveyor belt 801. A photoelectric cell 407 is mounted to one conveyor side fence 807. A light beam 408 emitted by photoelectric cell 407 extends across gathering conveyor belt 801 to reflector 409 mounted on the other conveyor side fence 807. The photoelectric cell 407 and reflector 409 are positioned immediately below the row of cartridge dispensers 500 such that a product dispensed by one of the product dispensers in the row interrupts light beam 409 as it falls to gathering conveyor belt 801.

A plurality of cartridge slide rails 501 are mounted to cross rail 503 at a predetermined angle such that each cartridges 530 leans toward the side of gathering conveyor belt 801. Mounting the cartridge slide rails 501 at an angle permits easier access to cartridges 530 for replenishing with products.

Cartridge slide rail 501, together with solenoid 507 and actuating arm 511 (not shown, see FIG. 5), as well as cross rail 503, form a universal product dispenser platform, capable of accepting a wide range of sizes and shapes of cartridges 530. Though cartridges 530 are shown in a cylindrical shape having a fixed diameter, cartridges in different shapes and sizes, for example rectangles, are mountable on universal product mount 811 for dispensing of products stored therein.

Cartridges 500 are slidably mounted to cartridge slide rails.501, thereby permitting a cartridge 530 to be slid into an extended position, indicated in phantom, for easier on-line replenishing. When extended, a cartridge may be opened and replenished as described in connection with FIG. 6. Mounting the slide rails 501 tilted toward the nearest side of gathering conveyor belt 801 also facilitates removal of empty cartridges 530 and replacement with cartridges prestocked with product. A cartridge is held in an extended position by placing a bolt 615 into the key hole 619.

The invention has been described in connection with a preferred embodiment. This description is not intended to limit the scope of the invention to the particular form set forth. On the contrary, it is intended to cover such alternatives, modifications, and equivalences as may be included within the spirit and scope of the invention as defined in the appended claims.

We claim:

1. An automated order system for dispensing a plurality of products of different types, comprising:

a gathering conveyor having virtually defined order zones and buffer zones for conveying dispensed products for subsequent collection;

a plurality of storage means arrayed in a column by row matrix, said storage means holding products of different shapes and sizes to be selectively dispensed onto the gathering conveyor;

a plurality of means for dispensing products onto the gathering conveyor, each means for dispensing coupled to a corresponding row and column of the storage means matrix;

first means for simultaneously actuating each of the means for dispensing coupled to each of the storage means in a selected column;

second means for actuating one means for dispensing per row at a time in one or more rows of the matrix to dispense products onto the gathering conveyor from multiple rows associated with a single column; and means associated with each row of the storage means matrix for verifying the dispensing of a product from the storage means matrix onto the gathering conveyor.

2. The automated order system as in claim 1 wherein the first means for actuating comprises a plurality of row relays, a single row relay coupled to each means for dispensing in the corresponding row; and the second means for actuating comprises a plurality of column relays, a single column relay coupled to each means for dispensing in the corresponding column; whereby actuating of a single column relay and at least one row relay causes each means for dispensing coupled to an actuated row and column relay to dispense product from the storage means.

3. The automated order dispensing system according to claim 2 wherein the first and second means for actuating further comprises a programmable logic controller coupled to the plurality of row and column relays for controlling the actuating of only one column relay and at least one row relay at a time.

4. The automated order dispensing system according to claim 3 wherein the programmable logic controller includes an input coupled to the means for verifying.

5. The automated order dispensing system according to claim 4 wherein said first and second means for actuating further includes a central control computer, coupled to the programmable logic controller for establishing a sequence for dispensing a product from the storage means.

6. The automated order dispensing system as in claim 1, the gathering conveyor having defined thereon a plurality of order zones and buffer zones, each order zone separated from another order zone by a buffer zone, the first and second means for actuating selectively actuating the means for dispensing to dispense products from the storage means only in the order zones.

* * * * *